United States Patent [19]

Chang et al.

[11] 3,916,390

[45] Oct. 28, 1975

[54] DYNAMIC MEMORY WITH NON-VOLATILE BACK-UP MODE

[75] Inventors: Joseph Juifu Chang, Poughkeepsie, N.Y.; Richard Arthur Kenyon, Underhill Center, Vt.

[73] Assignee: International Business Machines Corporation, Armonk, N.Y.

[22] Filed: Dec. 31, 1974

[21] Appl. No.: 537,796

[52] U.S. Cl. .......... 340/173 R

[51] Int. Cl.[2] .......... G11C 11/40

[58] Field of Search .......... 340/173 R, 173 CA; 307/238

[56] References Cited

UNITED STATES PATENTS

| | | | |
|---|---|---|---|
| 3,771,148 | 11/1973 | Aneshansley | 340/173 |
| 3,774,177 | 11/1973 | Schatter | 340/173 |

*Primary Examiner*—Vincent P. Canney

*Attorney, Agent, or Firm*—Howard J. Walter, Jr.

[57] ABSTRACT

A random access dynamic read-write FET memory system is provided with non-volatile storage of data in the event of a system power failure. The memory system includes an array of single device memory cells in which information is dynamically stored on a variable threshold non-volatile capacitor. A memory protect circuit detects system power supply failures and causes data volatively stored in the memory array to be non-volatively stored directly in the storage capacitor dielectric of each memory cell. Upon restoration of power, the non-volatively stored data is read from the array into a small auxiliary memory and the variable threshold storage capacitors are restored to their original state. Data is then returned to the memory cells in a dynamic mode.

11 Claims, 3 Drawing Figures

DYNAMIC MEMORY WITH NON-VOLATILE BACK-UP MODE

BACKGROUND OF THE INVENTION

1. Field of the Invention

This invention relates to data processing information storage systems and more particularly to a data storage system in which information is prevented from being destroyed during system power failures by temporarily storing the information contained in a dynamic volatile memory system in a non-volatile form.

2. Description of the Prior Art

Memories for computer systems generally comprise a hierarchy of various different technological types of memory units selected on the basis of cost and performance considerations. Small, fast semiconductor memories are normally used as a working store and are directly accessible by a computer processing unit. The speed of such memories is achieved at considerable expense per bit of stored information. Larger, slower and less expensive semiconductor and/or magnetic memories may be used as intermediate levels of storage, while comparatively slow, but cheap per bit of storage data, moving magnetic storage, such as discs and tapes, are used as mass backup storage units.

The development of relatively inexpensive, high performance semiconductor storage units has influenced memory system designers to attempt to utilize semiconductor memories for a larger share of the overall storage requirements. The field effect transistor (FET) memory described by R. H. Dennard in commonly assigned U.S. Pat. No. 3,387,286, entitled "Field Effect Transistor Memory," requires only a single FET gating device and a storage capacitor per bit of stored data. Power requirements, cost per bit, and speed of such memories makes them ideal for large inexpensive mass memories. However, as in most semiconductor memories, the single FET memory cell of Dennard stores data in a volatile form which requires a constant source of power to sustain the data. Magnetic storage units, which could be replaced by semiconductor memory units, are normally non-volatile and require no external source of power to sustain data. For this reason, system designers and users are reluctant to accept volatile memories as replacements for non-volatile magnetic storage devices.

While non-volatile semiconductor memory devices are known, they are unsuitable for use in main memory systems. Transistors such as the well known metal-trapping layer-oxide-semiconductor (MXOS) variable threshold transistors lack the high speed switching characteristic necessary for high speed memory operation. These devices also require on-chip switching of high level voltages that complicates the semiconductor processing necessary for their fabrication.

Known approaches to the solution of the problem of preserving volatively stored data in semiconductor memories include the use of an emergency battery to provide a continuous supply of power to the memory array. Such a system is described in U.S. Pat. No. 3,562,555 to R. W. Ahrons. The ability to sustain power by a battery is limited to a relatively short period of time and may prove difficult to employ if the memory is not connected with a complete system, as in the shipping and storage of memory units.

Other solutions to the problem which combine the non-volatile MXOS technology with a dynamic memory cell are described in U.S. Pat. Nos. 3,761,901 and 3,771,148 to N. E. Aneshansley and U.S. Pat. No. 3,774,177 to A. M. Schaffer. These patents suggest that a non-volatile MXOS device be substituted for one of the FET gating devices in a conventional volatile memory cell. For example, U.S. Pat. No. 3,771,148 teaches the replacement of the single FET device in the Dennard cell with an MXOS variable threshold transistor. Although these techniques solve some of the problems created by the use of a battery to provide long term storage and require no external power after the memory has been written in its non-volatile state, they retain all of the undesirable processing problems presented by the well known MXOS device memories. Specifically all of these techniques require that the normal logic switching circuits on a semiconductor substrate carry both normal relatively low operating voltages required by the dynamic memory and the high voltages required to provide switching of the non-volatile devices. Special circuit devices and isolation techniques are required in order to implement such a system. In addition, the technique utilized to transfer the data initially stored in the form of a charge on a capacitor to the non-volatile device, known as channel shielding, becomes less and less efficient as the size of the memory array and the capacitance of the bit lines increases. Also because the non-volatile gating device is connected to a bit sense line and must be rendered conductive in order to be written in a non-volatile mode, only a single word line at a time may be non-volatively stored in order to maintain isolation between different work lines connected to the same bit line. This constraint considerably lengthens the period of time between detection of the power failure and complete non-volatile storage of data in the memory array because of the additional number of memory cycles required.

SUMMARY OF THE INVENTION

It is, therefore, an object of this invention to provide a non-volatile back-up mode of operation for a dynamic random access read-write semiconductor memory in which volatile data can be semi-permanently stored within a single extended memory cycle.

It is another object of this invention to provide a memory data protection system including non-volatile storage devices in which the high potential voltages necessary for writing in a non-volatile mode are not required to be switched by FET devices on the semiconductor substrate.

The present invention accomplishes these and other results through the utilization of a single charge transfer device capacitor memory cell in which the capacitor includes a variable threshold dielectric medium which can be switched between high and low threshold states under the influence of the charge stored on the capacitor. The gating or transfer device of the memory cell is used to isolate the stored charged from the bit lines to enable the non-volatile writing of the entire memory array during a single extended memory cycle. The memory operates as a dynamic volatile memory during normal operation and upon the detection of an impending power failure causes stored data to be non-volatively stored. After resumption of system power, the data contained in individual storage units is temporarily transferred to a system associated memory while the storage capacitors are returned to their initial low threshold state. Thereafter the temporarily stored data is returned to the memory array which resumes its volatile storage mode.

The foregoing and other objects, features and advantages of the invention will be apparent from the following more particular description of the preferred embodiment of the invention, as illustrated in the accompanying drawings.

DESCRIPTION OF THE PREFERRED EMBODIMENT

A single device memory cell of the preferred embodiment of this invention is designed to operate in a manner well known in the art. For a more complete description of the operation of the cell, reference is made to the previously identified patent of R. H. Dennard.

Figure 1:
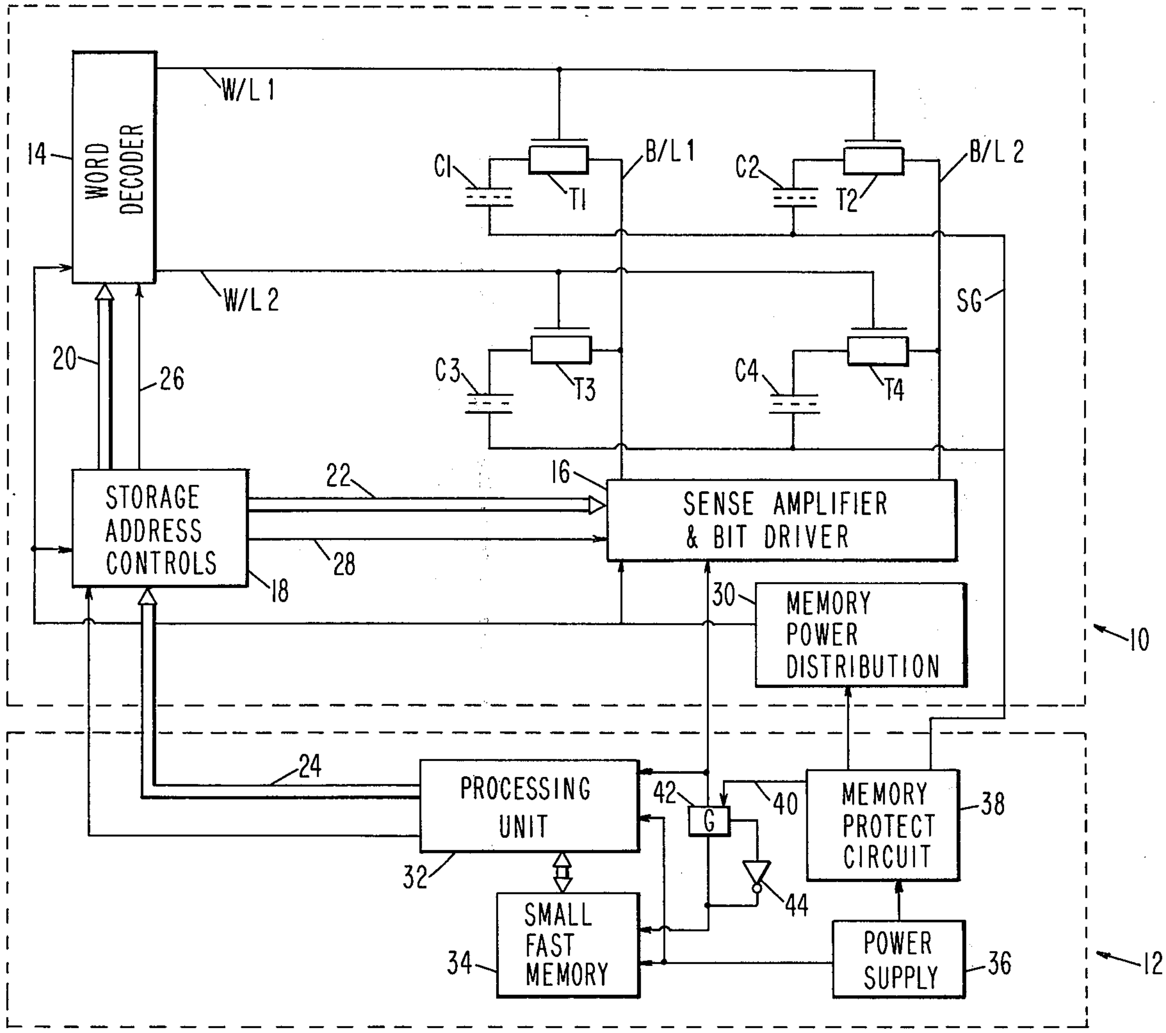
FIG. 1 is a schematic circuit diagram of the memory system of the invention showing the relationship of the transfer, device, variable threshold storage capacitor and the various control elements of the system.

Referring to FIG. 1 there is shown a memory unit 10 coupled to a data processing system 12. Memory unit 10 includes by way of example an array of four single device memory cells organized in columns and rows. Each cell includes an MOS gating or transfer device Tn having one of its current conducting terminals connected to one plate of a variable threshold storage capacitor Cn. Although, for clarity, the transfer device and storage capacitor are shown schematically as a discrete MOSFET and capacitor, in the preferred embodiment the current conducting terminal of the MOSFET connected to the capacitor is in fact a common voltage node, as will be described in further detail in reference to FIG. 2. The other plate of each capacitor Cn is connected to a line SG normally connected to a reference potential. The control or gate electrode of each transfer device in a common row is connected by a word line W/L to a word decoder 14, which may be of conventional design and may utilize, for example, dynamic FET NOR gates. The other current conducting terminal of each transfer device Tn in a common column is connected to a bit line B/L, which is connected to a sense amplifier and bit driver circuit 16. Numerous technical articles and patents are available that describe various sense amplifiers and bit drivers suitable for use in circuit 16. For example, a charge transfer sense amplifier and bit driver as described in commonly assigned U.S. Pat. No. 3,764,906 to L. G. Heller may be used. Control of the memory array is primarily provided by storage address control unit 18 which includes logic and other support circuits necessary to provide address signals to word decoder 14 and sense amplifier and bit driver circuit 16 over buses 20 and 22 from address bus 24 and to provide timing signals over lines 26 and 28 for proper operation of the array. Also provided on memory unit 10 is a memory power distribution means 30, which provides various power supply voltages necessary for proper operation of the memory unit and normally consists of a plurality of conductive voltage distribution buses. In he event of a power failure at the data processing system level the loss of these power supply voltages normally would result in destruction of the data stored in the array.

Data processing system 12 includes a processing unit 32 which has associated with it a small fast memory 34 of any known configuration and technology. The minimum capacity of memory 34 should be large enough to at least hold all of the data stored in a single array of a memory unit 10, as will be explained below. A data processing power supply 36 connected to a commercial utility provides power for the data processing system 12. A memory protect circuit 38, such as described by R. W. Ahrons in U.S. Pat. No. 3,562,555, monitors the condition of the voltages provided by power supply 36 and provides power supply and reference voltages to memory unit 10. Upon the detection of a failure or interruption in power supply 36, memory protect circuit 38 has sufficient residual power, provided by batteries, a capacitor storage circuit or a momentum driven fly wheel generator, to sustain the voltages provided to memory power distribution means 30 for a time period sufficient to allow volatile data to be semi-permanently stored in a non-volatile state. Memory protect circuit 38 also controls the reference potential level applied to line SG in the normal dynamic mode of operation of memory unit 10 and also has a switching capability for providing non-volatile write and erase potentials to line SG in the event of a power failure and subsequent restoration of the memory unit to the dynamic mode. Circuit 38 also provides a gating signal on line 40 to control gate 42 upon the resumption of normal power. Normally gate 42 allows two-way transfer of data between small fast memory 34. In the event of a power failure and subsequent resumption of power, gate 42 is energized to direct data from memory unit 10 through inverter 44 before it is temporarily stored in small fast memory 34 for reasons to be explained below.

Figure 2:
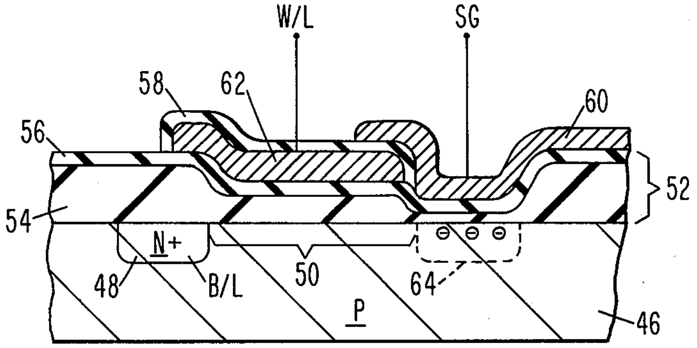
FIG. 2 is a cross-section of an integrated circuit structure in accordance with the invention showing the physical structure of a single memory cell.

Referring now to FIG. 2, the volatile and non-volatile modes of operation of the memory cell of the invention will be explained. FIG. 2 is a cross-section of an integrated circuit structure of a single FET memory cell of the invention. The memory cell of FIG. 2 is similar in construction and operation to the charge-coupled single device memory cell described by L. M. Terman in the article "Small Area Charge Memory Cells," IBM Technical Disclosure Bulletin, Volumn 15, Number 5, Sept. 1972, pages 1227–1229.

A semiconductor substrate 46, of, for example, p-type silicon material, has diffused therein a longitudinally extending n+ diffusion region 48 corresponding to bit line B/L in FIG. 1. Laterally spaced from B/L diffusion 48 is a channel or transfer region 50. Overlying the surface of semiconductor substrate 46 is a variable thickness composite dielectric layer 52 comprising a silicon dioxide layer 54 and a silicon nitride layer 56. A conductive transfer electrode 62, connected to a word line W/L, is spaced by layer 52 about 600 Angstrom units from the surface of substrate 46. The portion of dielectric layer 52 overlying channel region 50 provides, in conjunction with transfer electrode 62, a fixed threshold field effect structure and comprises about 300 Angstrom units of silicon dioxide and 300 Angstrom units of silicon nitride. Adjacent to electrode 62 is a storage gate electrode 60, connected to line SG in FIG. 1, which, in conjunction with its underlying portion of layer 52, provides a variable threshold field effect storage capacitor. Dielectric layer 52 under storage gate 60 comprises about 30 Angstrom units of silicon dioxide and about 300 Angstrom units of silicon nitride. Transfer electrode 62 and storage gate 60 are insulated from each other by a layer of insulating material 58, perferrably formed as an oxidization product of transfer electrode 62.

As those skilled in the art will recognize, the dielectric structure under storage gate 60 is the well known MNOS structure used in various nonvolatile memory devices. Such a structure is capable of modifying the effective threshold of the underlying semiconductor surface depending upon whether or not charges have tunnelled through the thin silicon dioxide layer under the influence of a potential impressed on storage gate 60. Further details of the fabrication process suitable for implementing the basic processing of this invention may be obtained by referring to commonly assigned U.S. Pat. No. 3,811,076 to W. M. Smith, Jr.

Under normal operating conditions the memory cell of FIG. 2 acts as a volatile charge-coupled memory cell as described in the previously referred to Terman article. Charge is stored under storage gate 60 in a potential well 64 which simultaneously acts as the drain of an FET and one plate of the storage capacitor. A positive potential Vref is applied to storage gate 60 by line SG which is sufficiently high to create potential well 64 but not high enough to alter the threshold or flat band of the capacitor. The cell is written, read and refreshed in the same manner as conventional single FET memory cells previously referred to.

In the event of a power interruption, transfer gate 58 is maintained at zero volts to provide isolation between bit line diffusion 48 and potential well 64. The normally fixed reference potential V*ref* is raised to a level equal to the positive write potential +V*w* necessary to cause minority carriers, if any, in potential well 64 to tunnel through the thin silicon dioxide layer 54 in composite dielectric 52 to alter the threshold of the capacitor, or to charge the flat band voltage at the semiconductor surface under storage gate 60. The actual +V*w* potential used will depend on factors such as the desired charge retention characteristics of the capacitor and the desired retention time. If charge, corresponding to a volatively stored logical one is present, in the storage node, the flat band voltage will increase because there will be a sufficiently large potential developed across the dielectric under storage gate 60 to cause tunnelling to take place. However, if no charge is present, corresponding to a stored logical zero, the majority of the field from storage gate 60 will be dropped across the depletion layer and the flat band, or threshold, will not shift. The volatile data will then be held in the MNOS structure without a need for external power. Upon the resumption of normal power and after the non-volatively stored data has been read out of the memory cells, as described below, all of the storage capacitors in the array may be returned to their initial low threshold state by applying −V*w* to storage gates 60 through common line SG.

Figure 3:
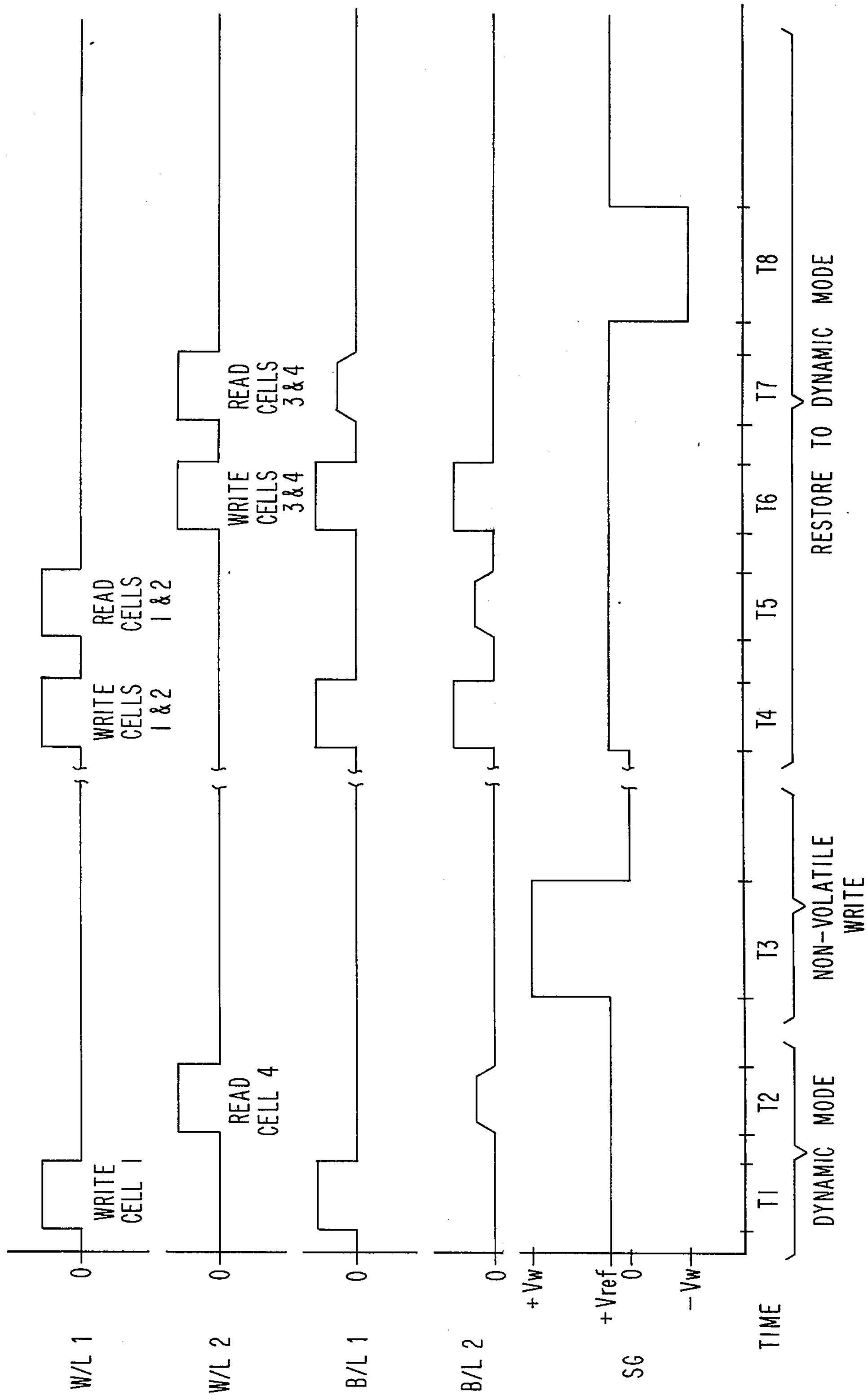
FIG. 3 is a graphical representation of the timing diagram for operation of the memory system.

The operation of the memory system of the invention will be described with reference to FIG. 1 and FIG. 3. FIG. 3 graphically illustrates a typical pulse program for operating the memory.

As shown at time period *t*1, data may be read into a memory cell in a conventional manner by the coincidence of a control pulse on a word line and a data pulse on a bit line. A logical one is written in cell 1 by simultaneously energizing W/L1 B/Li. The normal volatile reading of cell 4 is shown at time *t*2 where W/L2 is pulse and a voltage pulse, assuming a logical one was previously stored in cell 4, will appear on B/L2. During normal periods of operation data is sent back and forth directly between memory unit 10 and processing unit 32 and/or small fast memory 34 through gate 4. Memory protect circuit 38 provedes V*ref* on common line SG.

In the event of a power interruption, memory protect circuit 38 will continue to supply normal operating potentials to memory unit 10 for a short period of time. During *t*3 memory unit 10 ceases normal accessing operations and W/L1 and W/L2 are held at zero volts to keep any charge on capacitors C*n* isolated from the bit lines. Memory protect circuit 38 raises the potential on line SG to +V*w* causing data in the array to be non-volatively written. Memory unit 10 will now sustain the data indefinitely without a source of external power.

Upon the resumption of normal power, V*ref* is restored to line SG and all of the bit lines are raised as if attempting to write logical ones in each cell in the array one word line at a time. As shown at *t*4 memory cells 1 and 2 under control of W/L1 are attempted to be written with logical ones. During *t*5 the cells associated with W/L1 are read. Since only those storage capacitors set in a low threshold state, or having low flat band voltages, will have potential wells created under their storage gates, due to the previously logical zero state, sense amplifiers will detect the complement of the stored data. Storage capacitors initially containing logical ones will be set in the high threshold state and will not produce a potential well when V*ref* is applied to line SG and will be read during time period *t*5 as logical zeros.

The complemented data read during the non-volatile mode of operation is recomplemented in the following manner. When normal power is resumed, memory protect circuit 38 provides a signal on line 40 to gate 42 which diverts data read from storage unit 10 through an inverter circuit 44 which restores the data to its original state. The data is temporarily stored in small fast memory 34 until all word lines of a particular memory array have been read out, i. e., time periods *t*6 and *t*7. Note that although an external memory is required, the use of a small high speed memory in contrast to a low, slow speed storage medium required by battery back-up data transfer scheme is unnecessary. Because data is restored to the volatile mode while under full system power each memory unit 10 may be restored in sequence. In other systems which require the complete removal of volatile data to some non-volatile external medium the entire contents of the volatile data must be transferred prior to final loss of power which requires a much larger external storge capacity.

The sequencing of the restoration procedure may be under control of special logic provided in storage address control unit 18 or may be controlled by microprogrammed logic in processing unit 32.

After all data has been removed from the memory array, memory protect circuit 38 applies −V*w* to common line SG during time period *t*8 causing all of the variable threshold capacitors to be restored to the their low threshold state. Data is then returned to the memory unit in a normal manner to be stored in the dynamic, volatile mode.

It will be recognized by those skilled in the art that the use of a normally fixed potential supply line to provide non-volatile write and erase conditions eliminates the necessity of providing the memory array switching and gating circuits with the capability of switching the required high write and erase potentials required for non-volatile storage.

Although the invention has been described in terms of n-channel MNOS charge transfer device technology, those skilled in the art will recognize that p-channel devices and other non-volatile memory structures may also be used with equal success. It should also be understood that a plurality of memory units each containing a plurality of arrays would normally be used.

While the invention has been particularly shown and described with reference to a preferred embodiment thereof, it will be understood by those skilled in the art that various changes in form and details may be made therein without departing from the spirit and scope of the invention.

What is claimed is:

1. A memory system comprising:

a fixed threshold field effect charge transfer means having a control electrode for controlling the conductivity of a semiconductor channel region;

a variable threshold capacitive storage means, having stable high and low threshold states, for storing information representative of a first and second logical states, said first logical state corresponding to the presence of a charge and second logical state corresponding to the absence of a charge, said storage means being serially connected between said channel region and a source of potential;

dynamic memory control circuit means for applying signals to said control electrode to dynamically store and retrieve information when said storage means is in said low threshold state; and non-volatile memory control circuit means for changing the potential of said source of potential to a level sufficient to change the threshold state of said storage means from said low state to said high state when a charge is dynamically stored on said storage means in order to non-volatively store said information.

2. The memory system of claim 1 further including means for sensing the logical state of said storage means in both said high and low threshold states.

3. The memory system of claim 1 wherein said non-volatile memory control circuit means further includes means responsive to the interruption of power supplied to said memory system for initiating a change in the potential of said source of potential in the event of a power interruption.

4. The memory system of claim 1 further including means for changing the threshold state of said storage means from said high threshold to said low threshold state.

5. A data processing system comprising:

a memory array including a plurality of random access memory cells, each memory cell comprising a charge transfer means responsive to signals on a word line to couple a bit line to a variable threshold storage capacitor having stable high and low threshold states, said storage capacitor having an electrode connected to a controllable source of potential; and memory cell access means for storing information in said storage capacitors in a dynamic mode of operation when said storage capacitors are in said low threshold state; and storage protection means for controlling said source of potential to provide a fixed bias potential when information is stored in said dynamic mode, and to provide a non-volatile high threshold write potential to said electrode in response to an interruption in power to said data processing system to cause interruption in said memory array to be stored in said storage capacitors in a non-volatile mode of operation.

6. The data processing system of claim 5 wherein said storage protection means further includes means for converting said memory array from said non-volatile mode of operation to said dynamic mode of operation.

7. The data processing system of claim 5 further including:

an auxiliary memory;

means for transferring information non-volatively stored in said memory array to said auxiliary memory and wherein said storage protection means further provides a non-volatile erase potential to said electrode to restore said variable storage capacitors to said low threshold state.

8. In a data processing system, the method of preventing the destruction of information volatively stored as a potential across the dielectric of a plurality of capacitors of a memory system, in the event of an interruption of power in the power supply of said data processing system, comprising the steps of:

detecting an interruption of power in the power supply of the data processing system;

sustaining power to said memory system for a predetermined period of time;

transferring said volatively stored information on said capacitors directly to the dielectric of said capacitors to be stored in a non-volatile form;

detecting the resumption of power in said power supply of said data processing system;

reading said non-volatively stored information in said memory system to an auxiliary memory;

erasing the non-volatively stored data from said memory system; and returning said information from said auxiliary memory to said memory system to be volatively stored.

9. A capacitive storage memory system for a data processing system comprising:

an array of addressable memory cells arranged in columns and rows, each of said memory cells comprising a fixed threshold field effect device responsive to an addressing signal for transferring charge through a channel region between a storage node and a bit line, each memory cell further comprising a variable threshold capacitive storage means serially connected between said storage node and a source of potential; and non-volatile write means for selectively altering the threshold of said variable threshold capacitive storage means in response to a charge on said storage node.

10. The capacitive storage memory system of claim 9, wherein said non-volatile write means is responsive to an interruption in the source of power to said data processing system.

11. The capacitive storage memory system of claim 10 wherein said variable threshold capacitive storage means comprises a metal-nitride-oxide-semiconductor structure.

* * * * *